US008579096B2

(12) United States Patent
Mán

(10) Patent No.: US 8,579,096 B2
(45) Date of Patent: Nov. 12, 2013

(54) SWITCHABLE FREE-WHEEL DEVICE FOR A TRANSMISSION, PARTICULARLY FOR A CRANK-CVT OF A MOTOR VEHICLE

(75) Inventor: László Mán, Ottersweier-Unzhurst (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 223 days.

(21) Appl. No.: 13/065,336

(22) Filed: Mar. 19, 2011

(65) Prior Publication Data

US 2011/0259697 A1   Oct. 27, 2011

(30) Foreign Application Priority Data

Sep. 19, 2008 (DE) .................. 10 2008 048 026

(51) Int. Cl.
*F16D 41/08* (2006.01)

(52) U.S. Cl.
USPC .............................................. 192/43; 192/44

(58) Field of Classification Search
None
See application file for complete search history.

(56) References Cited

U.S. PATENT DOCUMENTS

| 2,737,275 A * | 3/1956 | Szady ........................... 192/45.1 |
| 3,643,768 A * | 2/1972 | Titt .............................. 192/41 A |
| 5,343,992 A | 9/1994 | Stark et al. ................... 192/45.1 |
| 5,690,032 A * | 11/1997 | Koga et al. .................. 104/172.1 |
| 5,894,915 A | 4/1999 | Igari et al. .................... 192/45.1 |
| 7,108,626 B2 | 9/2006 | Friedmann ........................ 475/8 |
| 8,307,925 B2 * | 11/2012 | Tang et al. ............... 180/65.275 |

FOREIGN PATENT DOCUMENTS

DE    11 57 037 B    11/1963
DE    102 43 535 A1    4/2003

* cited by examiner

*Primary Examiner* — David D Le
*Assistant Examiner* — Mark Manley
(74) *Attorney, Agent, or Firm* — Alfred J. Mangels

(57) ABSTRACT

A switchable free-wheel device for a transmission for a crank-driven CVT of a motor vehicle. The device includes at least one free-wheel unit with a drivable outer ring, an inner ring in the form of an output shaft, and clamping bodies disposed between the rings and rotatable about their longitudinal axes. In the axial direction, each of the clamping bodies includes first and second grooves that are axially spaced from each other and offset relative to each other in the peripheral direction of the clamping body. Annular worm springs surrounding the clamping bodies are displaceable in the axial direction of the body by a switching mechanism, such that the springs engage either in the first groove or in the second groove. The clamping body rotates about its longitudinal axis such that the force applied by the worm spring runs on a side of the longitudinal axis.

13 Claims, 4 Drawing Sheets

SWITCHABLE FREE-WHEEL DEVICE FOR A TRANSMISSION, PARTICULARLY FOR A CRANK-CVT OF A MOTOR VEHICLE

BACKGROUND OF THE INVENTION

1. Field of the Invention

The present invention relates to a freewheel device for a transmission, particularly for a crank CVT of a motor vehicle.

2. Description of the Related Art

DE 102 43 535 A1 discloses a continuously variable transmission that includes an input shaft and an output shaft that are rotatably supported and positioned parallel to each other in a transmission. Both shafts are connected with one another via an eccentric device of the input shaft and a freewheel device disposed on the output shaft, as well as a connection device connecting the eccentric device and the freewheel device. The eccentric device includes several eccentric units that are disposed axially next to one another on the input shaft. The freewheel device includes several freewheel units that are disposed axially next to one another on the output shaft. To form each eccentric unit, the input shaft includes a guide section eccentrically offset with respect to its rotation axis, on whose jacket surface an eccentric component is rotatably supported. At least a connecting rod is rotatably disposed on the eccentric component during the design of the crank continuous variable transmission (crank CVT).

Through the rotation of an adjustment shaft disposed in a recess of the input shaft, the size of eccentricity of the eccentric component is changed with regard to the axis of rotation of the input shaft.

The units disposed on the output shaft have respective clamping bodies that are disposed between an inner ring formed by a section of the output shaft and an outer ring. The the surfaces of the outer ring and the inner ring are matched to each other such that the clamping bodies can block this rotation in a relative direction of rotation between the inner ring and outer ring, so that the outer ring and the inner ring are jointly rotated. In the other relative direction of rotation between the outer ring and the inner ring, no blocking effect is caused by the clamping bodies. The individual clamping bodies are actuated in the blocking direction, which can occur at least through a spring element. Individual clamp bodies are positioned next to each other in the circumferential direction, at least via a cage.

It is possible to make the clamping effect of the clamping bodies capable of switching with the help of switching units. Thereby, each switching unit is disposed between two neighboring clamping bodies. The switching units are synchronously actuatable and have, respectively, a rotatable disk-shaped section as well as a profiled section at which a torsion spring is disposed. The torsion spring is held between the profiled section and a neighboring clamping body. For this purpose, the torsion spring has a leg that can act against a clamping body in the corresponding blocking direction. The torsion spring and the profiled sections are eccentrically disposed with respect to the axis of rotation axis of the disk-shaped section, so that in a during rotation of the disk-shaped section a circumferential displacement of the spring element and the profiled sections takes place. The disk-shaped sections are disposed in a carrier part. In the case of rotation of the disk-shaped sections by approximately 180°, the bracing direction and/or the force direction of the torsion spring and/or the above-mentioned limb thereof changes with respect to the clamping bodies. It is apparent that such switching units are problematic with regard to its mechanical structure, its susceptibility to disturbance and/or service life, as well as its manufacture.

An object of the present invention, therefore, involves providing a switchable freewheel device for a transmission, one that is constructed comparatively simply out of relatively few parts.

SUMMARY OF THE INVENTION

The object is achieved by a switchable freewheel device for a transmission, particularly for a crank CVT of a motor vehicle, with at least a freewheel unit that includes a drivable outer ring, an inner ring in the form of an output shaft, and a clamping body disposed in-between. Thereby, the clamping bodies include a first groove and a second groove, disposed, respectively, in an axial direction from one another, and offset in the circumferential direction of the clamping bodies in a manner overlapped to each other. An annular worm spring externally surrounding the clamping body, and radially pretensioned on the output shaft, is slidable through a switching mechanism in the axial direction such that it engages either in the first groove or in the second groove, whereby the clamping body is rotated such that the force applied by the worm spring passes on one or the other side of the longitudinal axis. The clamping bodies are intended to generate a setup moment in one or the other direction of each of the roll elements that have a cylindrical cross-section, which have, respectively, a comparatively large diameter in the direction of every groove. Thus, if the worm spring is in the first or second groove, the second or first groove is aligned to develop a clamping force between the outer ring and the output shaft in one or the other direction.

The bases of the first- and second grooves extend in a respectively arched manner, and are designed so that the setup moments applied by the worm spring switch the freewheel respectively in a uniform manner via a small lever arm. Preferably, the bases of the first and second grooves are designed somewhat circular in shape. The counter force applied by the worm spring to produce a frictional force between the clamping bodies and the driven axis is large, on the other hand.

The clamping bodies include, preferably in the middle on the longitudinal axis, axially extending plug parts that engage, respectively, into a recess of an annular carrier part. The carrier parts form a cage holding the clamping bodies axially opposite thereof, which cage is disposed concentrically to the output shaft. The recesses are formed oblong in the circumferential direction of the cage. The worm spring has a tightly wound coil spring for applying a particularly large frictional force between the clamping bodies and the input shaft and/or the inner ring. It is constructively disposed in a particularly simple manner in an annular groove, opening towards the clamping bodies, on the inner circumference of the outer ring, whereby the radial dimension of the groove of the outer ring is larger than the diameter of the worm spring, so that it can be displaced radially into the groove.

In a preferred embodiment of the present invention, the switch mechanism includes a switching part that is axially movably disposed in an axial recess of the output shaft, on which at least a pin is fixed which is guided radially outwards through a cutout of the input shaft, which is disposed outside in a circular annular switching part that acts laterally on the clamping bodies upon an axial displacement of the switching part in order to switch it axially. Thereby, the cutout of the output shaft features a larger dimension than the pin in the axial direction, such that the worm spring is then located in the first groove when the pin strikes on the one side of the cutout, and when the pin strikes on the other side of the cutout, it is located in the second groove. Preferably, the switching part is a switching tube that is guided in the axial recess of the output shaft, and the switching part has the form of an annular switching sleeve surrounding the output shaft. These exemplary embodiments are constructively particularly simple. During its axial displacement, the switching sleeve acts, via suitable bearing arrangements, on the carrier parts of the cages holding the clamping bodies.

To implement a preferred freewheel device on the output shaft, the present invention includes several freewheel units, axially next to one another, forming a freewheel package, which are movable axially on the output shaft by means of at least a pin part. Thereby, also several freewheel packages can be disposed on the output shaft axially next to one another. The present freewheel device can be part of a crank-CVT-transmission, whereby the outer ring of every freewheel unit is rotatably connected with a connecting part.

BRIEF DESCRIPTION OF THE DRAWINGS

In the following, the invention and its embodiments are clarified in more detail in context with the figures. Shown are.

DESCRIPTION OF THE PREFERRED EMBODIMENTS

Figure 1:
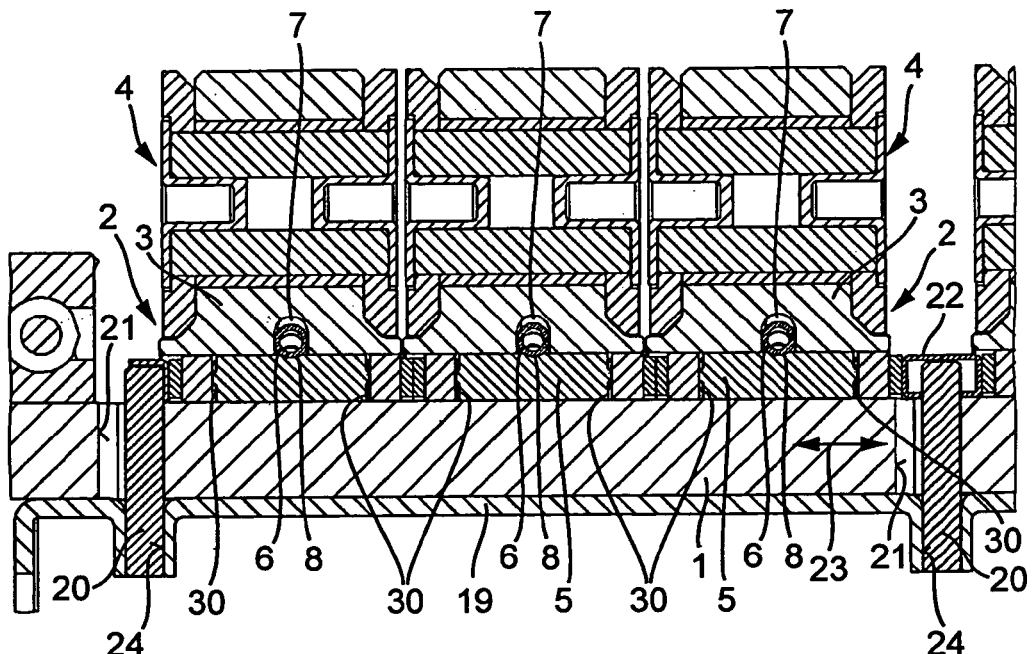
FIG. 1 in a longitudinal section through a freewheel device according to the invention, wherein three freewheel units are disposed axially next to one another on an output shaft of a transmission, and wherein the freewheel is switched in one direction.

As shown in FIG. 1, the freewheel device according to the invention includes essentially one output shaft 1 that is rotatable about an axis of rotation about which several freewheel units 2 are disposed axially next to one another. Each freewheel unit 2 includes essentially an outer ring 3, on which a connecting part 4 is disposed in a known manner, which is non-rotatably connected with the outer ring 3.

The actual freewheel of every freewheel unit 2 is formed by a corresponding section of the output shaft 1 serving as an inner ring. Within the outer ring 3, between the outer ring 3 and the output shaft 1, preferably clamping body 5 is disposed in a cage, and a worm spring 6.

As is evident, the worm spring 6 is contained within and is dimensioned to fit within in a radially extending oblong groove 7 of the outer ring 3 that opens towards the clamping body 5, so that it is pulled and/or pressed, based on its spring force, against the outer circumference of the clamping body 5. The actual function of the worm spring 6 will be clarified later.

In connection with the so-called worm spring 6, it is a very tightly wound annular coil spring that runs about the entire outer circumference of the clamping bodies 5 of a freewheel unit 2. The worm spring 6 produces a large force for generating a large frictional force between the clamping bodies 5 and the input shaft 1, the latter of which preferably forms the inner ring of the freewheel.

Figure 4:
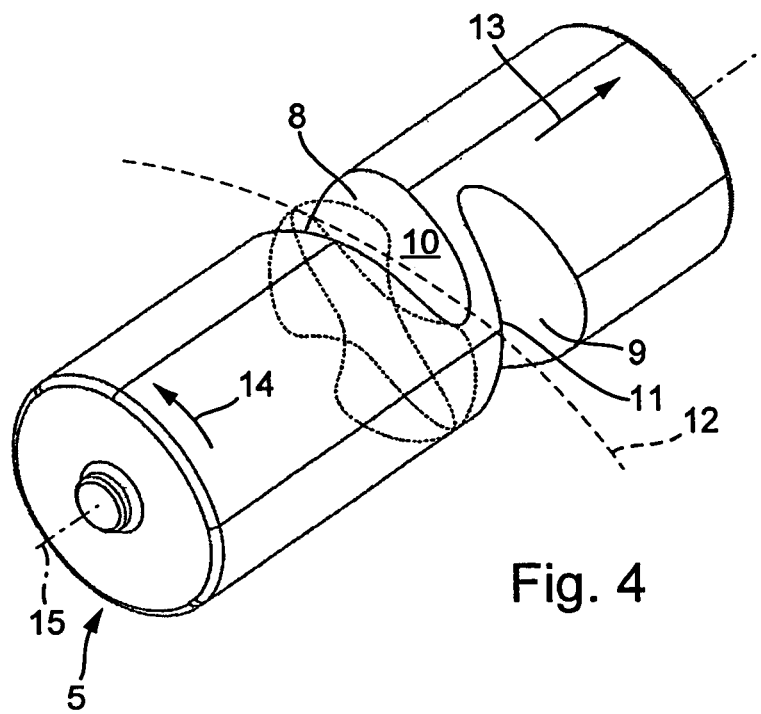
FIG. 4 a clamping body of the present freewheel device in a perspective representation

The clamping bodies 5 as shown in FIG. 4 have the form of cylindrical rollers, which on their outer circumference feature two grooves 8, 9 axially offset from each other. The grooves 8 and 9 are also disposed offset from each other in the circumferential direction of the clamping body 5. The grooves 8 and 9 have at least oblique side surfaces 10, 11 on the sides adjacent to one another, so that the worm spring 6 contained in them can emerge relatively easily out of the grooves 8, 9 during the switching process.

The clamping bodies 5 have, respectively, a cross-section that in the direction of every groove 8, 9 features a major diameter 27 and/or 28 (see FIGS. 5 and 6), so that if the worm spring 6 is in the first groove 8 or in the second groove 9, the second groove 9 or the first groove 8 is oriented in one or the other direction to develop its clamping force between the outer ring 3 and the input shaft 1. The grooves 8, 9 are distributed on the clamping bodies 5 such that they overlap in the circumferential direction when viewed in a cross section of a clamping body.

In the manner indicated by the line 12, the worm spring 6 in the example shown in FIG. 4 runs through the groove 8. If the worm spring 6 is axially moved in the direction of the arrow 13 by an appropriate switching mechanism, as illustrated in detail later, it slides over the oblique surface 10 out of the groove 8 and subsequently snaps into the groove 9. Since the grooves 8 and 9 are circumferentially offset relative to each other, the clamping body 5 rotates during this process in the direction of the arrow 14 about the contact point on the output shaft 1. Conversely, the clamping body 5 rotates in the direction opposite to the direction of the arrow 14 if the worm spring 6 is moved out of the groove 9 over the oblique surface 11 and into the groove 8 (FIG. 6).

Figure 5:
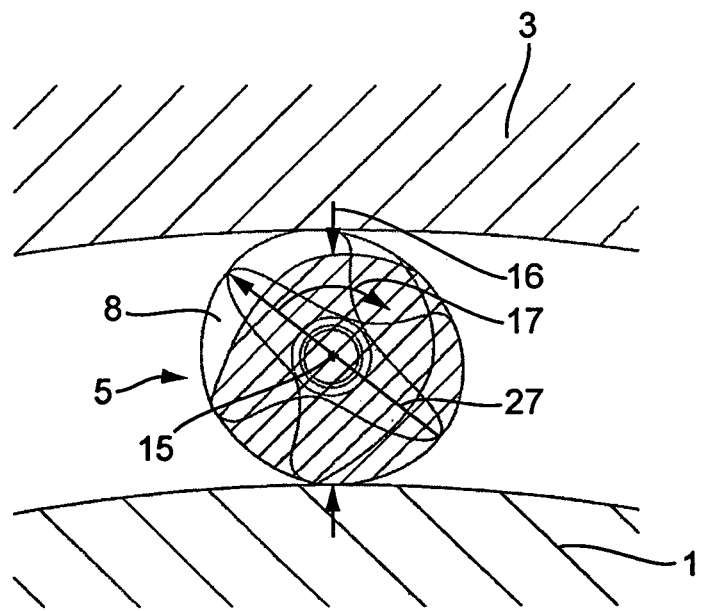
FIGS. 5 and 6 are representations for the explanation of the lever ratios in both directions.

In accordance with FIG. 5, which shows a side view of a section through the groove 8, the force of the worm spring 6, acting in the direction of arrow 16, presses in a stable position radially inward in the direction toward the output shaft 1. The groove 8 is formed so that the force of the worm spring 6 in the FIG. 5 condition acts on the right side of the longitudinal axis 15, so that the clamping body 5 is rotated clockwise, toward the right in the direction of the arrow 17. The freewheel is switched in the forward direction.

Figure 6:
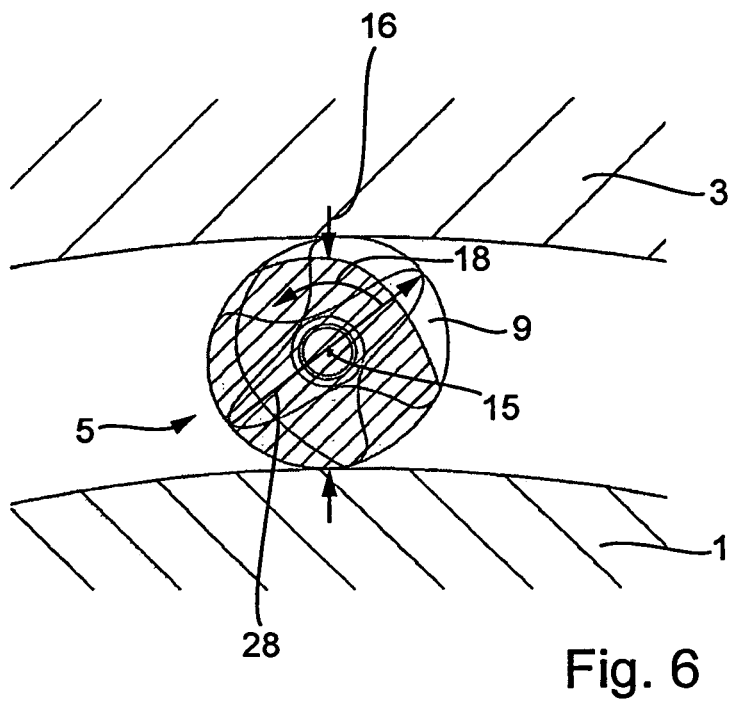

If the worm spring 6 is displaced axially in the direction of the groove 9, in accordance with FIG. 6, the force of the worm spring 6 acts in the direction of the arrow 16. The groove 9 is formed such that when the worm spring 6 snaps into the groove 9, the force applied by the worm spring 6 acts in the direction of the arrow 16 toward the output shaft 1, and the clamping body 5 is rotated counterclockwise, to the left relative to the longitudinal axis 15. The force acts along a line to the left of the longitudinal axis 15, thus the reason why the clamping body 5 is turned to the left in the direction of the arrow 18. The freewheel is turned into the forward direction.

Expressed otherwise, the freewheel is reversible through the changing setup moment as result of the changed lever ratios when displacing the worm spring 6 between the grooves 8 and 9. It is important that the force applied by the worm spring is relatively large so that the frictional force between the clamping bodies 5 and the output shaft 1 is also large. Because the lever effect is relatively small during rotation of the clamping bodies 5 on the output shaft 1, the force for setting up the clamping bodies 5 when clamping also is relatively small, which is extremely advantageous for the efficiency of the freewheel.

In the following description, the mechanism for displacing the worm springs 6 is illustrated in association with FIGS. 1 to 3. In the output shaft 1, there is a switching tube 19 from which pin parts 20 extend radially outwardly through a recess 21 in the output shaft 1. The outer ends of pin parts 20 preferably terminate in a switching sleeve 22 that is disposed on the outer circumference of the output shaft 1 in an axially displaceable manner. The recess 21 when viewed in an axial direction is axially larger in dimension than that of the pin part 20. In this manner, the pin part 20 can be displaced axially when displacing the switching tube 19 in the direction of the arrow 23. The axial widths are thereby dimensioned such that the pin part 20 strikes on an axial side of the recess 21 if the worm spring 6 is located inside the groove 8 or inside the groove 9.

For example, in accordance with FIG. 1, three freewheel units 2 are disposed next to one another on the output shaft 1. A switching sleeve 22 is disposed on at least one outer side of the external freewheel units 2.

The radially inner end sections of the pin parts 20 are preferably received in the openings 24 of the switching tube 19.

Figure 2:
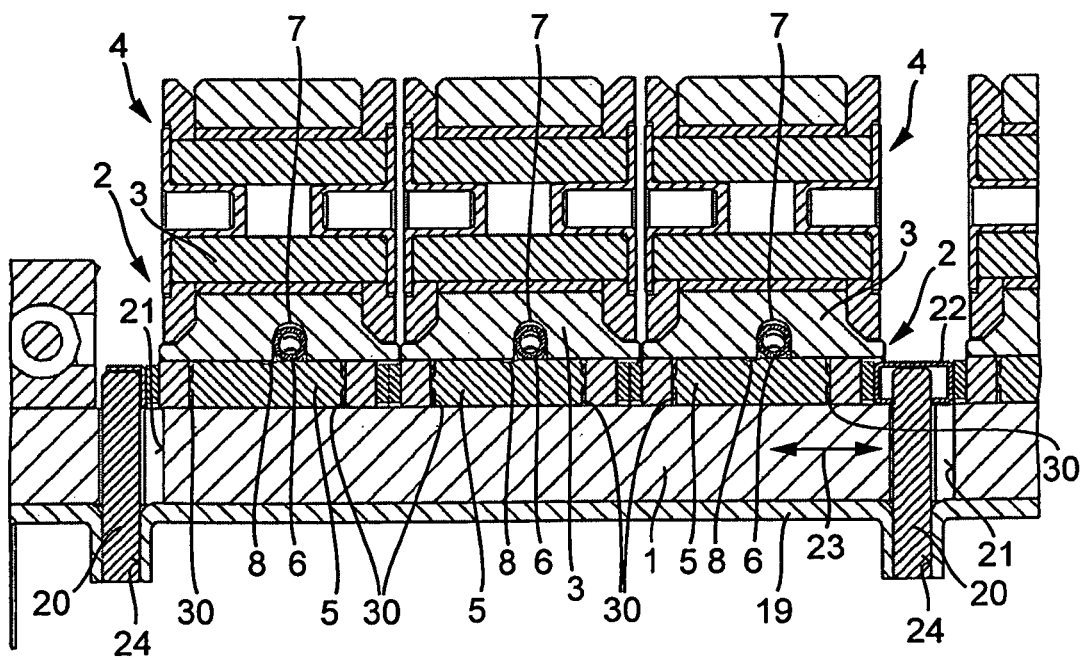
FIG. 2 the freewheel device of FIG. 1 in the moment of the switching of the freewheel into the other direction.

For switching the freewheel package, consisting of the three freewheel units 2 of FIG. 1, from the position represented in FIG. 1 in that the worm spring 6 engages into the groove 8 of the clamping body 5, the switching tube 19 is moved in the left direction of the double-headed arrow 23, to the position shown in accordance with FIG. 2. Thereby, the worm spring 6 is respectively lifted out of its associated groove 8, wherein it moves in the groove 7 radially outward in order to subsequently engage into the groove 9 of the clamping body 5 in accordance with FIG. 3. Thereby, the worm spring 6 moves in the groove 7 radially inward, as is apparent.

Figure 3:
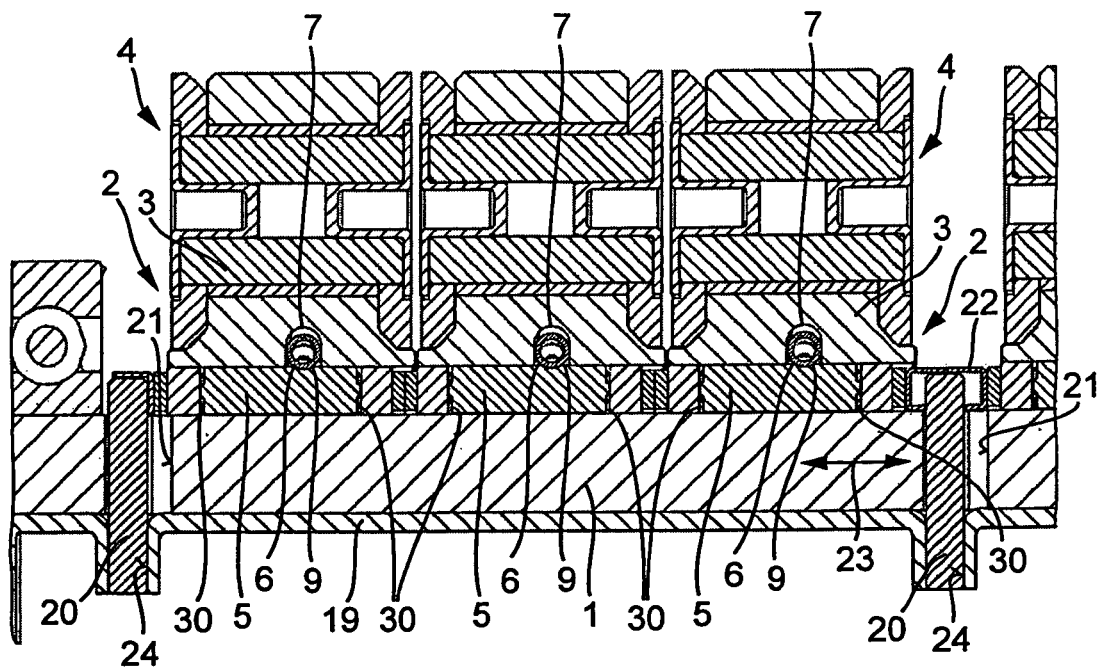
FIG. 3 the freewheel device switched into the other direction of FIG. 1
Figure 7:
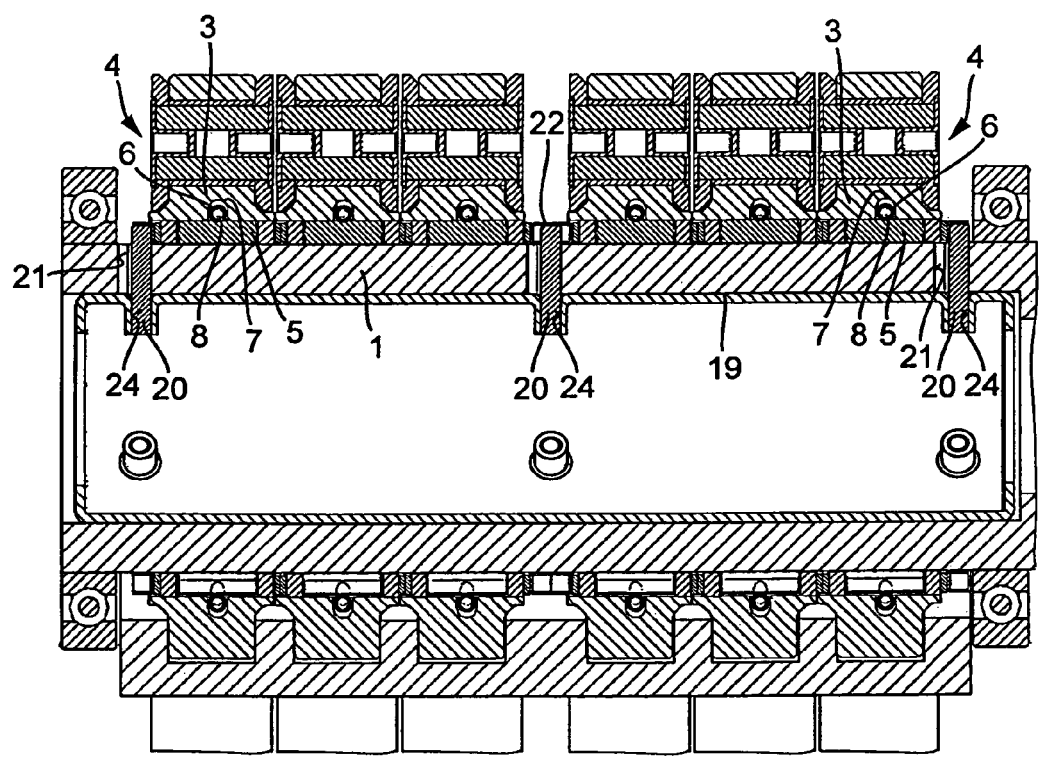
FIG. 7 a further embodiment of the invention.

FIG. 7 shows an arrangement corresponding with FIG. 3, with two freewheel packages, each include, respectively, three freewheel units 2 and are switched via a switching tube 19 that includes three pin parts 20. Two pin parts are disposed outside both freewheel packages for axial establishment of the freewheel packages. A pin part 20 engages in a sleeve part 22, which is disposed between both freewheel packages. Details of FIG. 7 that were already illustrated in connection with FIGS. 1 to 3 are designated in the corresponding manner.

What I claim is:

1. A switchable freewheel device for a crank-CVT of a motor vehicle, said device comprising: a free wheel unit that includes a drivable outer ring, an inner ring in the form of an output shaft, and clamping bodies rotatably disposed about the longitudinal axis of the shaft, wherein the clamping bodies include a first groove and a second groove spaced from each other in the axial direction of the shaft and offset relative to each other in a circumferential direction of the clamping body and overlapping each other, a pretensioned annular worm spring surrounding respective individual ones of the clamping bodies and displaceable in the axial direction of the clamping bodies from the respective grooves by a switching mechanism such that the spring engages either in the first groove or in the second groove, whereby the clamping body rotates such that a radial force applied to the clamping body by the worm spring acts on a side of the longitudinal axis for generating a set-up moment relative to the longitudinal axis of the clamping body, wherein the clamping bodies are cylindrical rolling elements with a cross-section in the direction of each groove with a comparatively large diameter such that when the worm spring is located in the first or second groove, the second or first groove is oriented in the one or other direction so that a clamping force can act between the outer ring and the output shaft.

2. The freewheel device according to claim 1, wherein a base of the first groove and a base of the second groove extend in an arched manner, and are arranged such that a radial force applied by the worm spring is respectively uniform over a small lever arm.

3. The freewheel device according to claim 2, wherein the base of the first groove and the base of the second groove are respectively in the form of a circular arc.

4. The freewheel device according to claim 1, wherein the clamping bodies include axially extending plug parts in the middle of each longitudinal end for rotational engagement in a recess of a circular carrier part, whereby axially opposite carrier parts form a cage disposed concentrically to the output shaft for holding the clamping bodies, and wherein the recesses are respectively oblong shaped in the circumferential direction of the carrier parts.

5. The freewheel device according to claim 1, wherein the worm spring is a tightly wound coil spring.

6. The freewheel device according to claim 1, wherein the worm spring lies in an annular groove on the inner circumference of the outer ring that opens toward the clamping bodies, wherein the groove of the outer ring has a radial extent that is larger than the diameter of the worm spring.

7. The freewheel device according to claim 1, wherein the switching mechanism is received in an axial recess of the output shaft and includes an axially displaceable switching part on which at least a pin part extends outwardly and is received radially in a recess in the output shaft, wherein the pin part is disposed on the outside of a switching part, which during an axial displacement of the switching part acts laterally on the clamping body in order to displace it axially, whereby the recess in the output shaft has a larger axial extent than the pin part, whereby the worm spring is received in the first groove when the pin part contacts one radially-extending side of the recess, and when the pin part contacts the opposite radially-extending side of the recess the worm spring is received in the second groove.

8. The free freewheel according to claim 7, wherein the switching part has a tubular form for axially guiding the switching part relative to the recess in the output shaft (1).

9. The freewheel device according to claim 7, wherein the switching part is an annular switching sleeve surrounding the output shaft.

10. The freewheel device according to claim 9, wherein the switching sleeve acts against a carrier part of a cage that holds the clamping bodies during axial displacement of the switching sleeve.

11. The freewheel device according to claim 1, wherein a plurality of free wheel units define a free wheel package and are arranged on the output shaft axially next to one another and fixed axially between a pair of pin parts that are axially spaced along the output shaft.

12. The freewheel device according to claim 11, wherein a plurality of free wheel packages are disposed axially next to one another on the output shaft.

13. The freewheel device according to claim 1, wherein the freewheel device is part of a crank-CVT transmission, whereby the outer ring (3) of each freewheel unit is non-rotatably connected with a connecting part.

* * * * *